United States Patent [19]

Thompson

[11] Patent Number: 5,178,545
[45] Date of Patent: Jan. 12, 1993

[54] ELECTRONIC PUZZLE GAME WITH UNKNOWN RANDOM TIME OF PLAY

[75] Inventor: Barbara J. Thompson, Knoxville, Tenn.

[73] Assignee: Tutor Toys, Inc., Knoxville, Tenn.

[21] Appl. No.: 652,543

[22] Filed: Feb. 8, 1991

[51] Int. Cl.⁵ ............................................. G09B 7/00
[52] U.S. Cl. .................................. 434/335; 273/429; 273/432; 273/431
[58] Field of Search .............. 434/169, 334, 335, 307, 434/308; 273/138 A, 237, 433, 429, 430, 431, 432

[56] References Cited

U.S. PATENT DOCUMENTS

| | | | |
|---|---|---|---|
| 4,114,294 | 9/1978 | Marmer | 35/31 |
| 4,189,779 | 2/1980 | Brautingham | 364/718 |
| 4,327,375 | 4/1982 | Leclerc | |
| 4,403,965 | 9/1983 | Hawkins | |
| 4,447,213 | 5/1984 | Culley | 434/201 |
| 4,457,719 | 7/1984 | Dittakavi et al. | |
| 4,505,682 | 3/1985 | Thompson | |
| 4,664,634 | 5/1987 | Cutler et al. | |
| 4,757,616 | 7/1988 | Hills | |
| 4,781,598 | 11/1988 | Cutler | |
| 4,799,890 | 1/1989 | Thompson et al. | |
| 4,959,017 | 9/1990 | Thompson et al. | |
| 4,961,579 | 10/1990 | Thompson et al. | |
| 4,978,302 | 12/1990 | Clossey | 434/153 |

Primary Examiner—Robert Bahr
Assistant Examiner—John P. Leubecker
Attorney, Agent, or Firm—Pitts and Brittian

[57] ABSTRACT

An electronic puzzle game for one or more players that combines skill and chance. The device includes a memory for storing codes corresponding to a plurality of sets of alphanumeric symbols, each set comprising a puzzle. A display is provided for visibly indicating a selected puzzle to the user(s), and a keypad permits a user to select a game, a topic within that game, and a category within the topic. Further, the keypad permits a user to ascertain a correct solution to the selected puzzle category. While skill is of value in playing a game with the device, a timer generates a signal at random times that calls an end to a game, the particular user of the device at this time being declared a loser. In the preferred embodiment, there is a second timer to establish a time duration for providing an answer by the user. Although significant memory exists within the device, additional or replacement memory can be plugged into the device.

5 Claims, 11 Drawing Sheets

| | | | |
|---|---|---|---|
| 102 | 192 | KNOWN FOR PITTSBURG | PA |
| 102 | 193 | KNOWN FOR THE LIBERTY BELL | PA |
| 102 | 194 | KNOWN FOR INDEPENDENCE HALL | PA |
| 151 | 195 | WASHINGTON MONUMENT | DC |
| 151 | 196 | JEFFERSON MEMORIAL | DC |
| 151 | 197 | LINCOLN MEMORIAL | DC |
| 151 | 198 | THE WHITE HOUSE | DC |
| 151 | 199 | THE SUPREME COURT | DC |
| 127 | 200 | KNOWN FOR THE EVERGLADES | FL |
| 112 | 201 | KNOWN FOR THE OUTER BANKS | NC |
| 112 | 202 | KNOWN FOR KITTY HAWK | NC |
| 115 | 203 | KNOWN AS BLUEGRASS COUNTRY | KY |
| 116 | 204 | KNOWN FOR THE TVA | TN |
| 104 | 205 | KNOWN FOR PEANUTS | GA |
| 127 | 206 | KNOWN FOR CAPE CANAVERAL | FL |
| 110 | 207 | KNOWN FOR WILLIAMSBURG | VA |
| 110 | 208 | KNOWN FOR JAMESTOWN | VA |
| 115 | 209 | KNOWN FOR MAMMOTH CAVE | KY |
| 116 | 210 | LARGEST CITY IS MEMPHIS | TN |
| 112 | 211 | LARGEST CITY IS CHARLOTTE | NC |
| 115 | 212 | LARGEST CITY IS LOUISVILLE | KY |
| 110 | 213 | LARGEST NAVAL BASE | VA |
| 128 | 214 | KNOWN FOR LLANO ESTACADO | TX |
| 128 | 215 | LEADING COTTON PRODUCER | TX |

FIG. 5

ELECTRONIC PUZZLE GAME WITH UNKNOWN RANDOM TIME OF PLAY

DESCRIPTION

1. Technical Field

This invention relates generally to electronic educational game devices, and more particularly to a portable device for posing questions related to a particular subject for answer by users, with provisions for displaying the answer upon demand, upon the completion of a fixed time interval for choosing the answer, or upon the completion of an unknown random time interval which concludes a game.

2. Background Art

Electronic educational and entertainment products are well known that are designed to deal with specific problems such as spelling, mathematics, reading or the like. Certain of these products have the capability of communicating with the user through synthesized speech. Typical of such products are those described in U.S. Pat. Nos. 4,327,375 issued to J. F. Leclerc on Apr. 27, 1982; 4,403,965 issued to W. R. Hawkins on Sept. 13, 1983; 4,457,719 issued to A. Dittakavi on Jul. 3, 1984; and 4,505,682 issued to B. J. Thompson on Mar. 19, 1985. In addition, the assignee of the present invention has been issued U.S. Pat. Nos. 4,799,890 for a device to teach the handling of money, 4,959,017 for teaching time concepts, and 4,961,579 as a general educational device.

In this latter patent ('579), a memory unit of a microprocessor stores codes corresponding to a plurality of sets of alphanumeric characters, each set comprising a "puzzle". A user, through the proper selection on a keyboard, can choose a degree of difficulty. Topics (from the sets of characters) are displayed together with sample letters (cues) as a hint to words that can be chosen to correspond to the topic. Typical topics are foods, animals, songs, etc. A fixed timer serves to determine the length of the time period a player has to solve the puzzle (select the most words). Audible signals are optional as to the counting of the times and the end of the count. The game is won by the person having the best knowledge of the topic for that person can list the greatest number of words/answers in the specified time.

None of the above games lend themselves well to "party" games where chance is intermingled with skill. As stated above, the person with the best knowledge of a topic nearly always wins. For a "beginner", this is often very discouraging.

Accordingly, it is an object of the present invention to combine an educational game device with a game of chance.

It is another object of the present invention to provide a device that poses a random question within a selected topic to a user for an answer, with this continuing until the expiration of an unknown random time interval.

A further object of the present invention is to provide a device that is passed among a plurality of persons that poses a random question within a selected topic to one of the users for an answer, and then to another user, with this continuing until the expiration of an unknown random time interval at which time that the current user is the "winner" or the "loser" of the game depending upon the rules of a particular game.

Another object of the present invention is to provide an educational and fun game related to geography such that the device poses a random question within a selected geographical topic to one of several users, with this continuing until the expiration of an unknown random time interval at which time the score of the current user is displayed.

It is still another object of the present invention to provide an educational and fun game that poses a random question to one of several users, with this continuing until the expiration of an unknown random time interval at which time the current user is the loser, the invention further providing a second and fixed time interval during which a particular question is to be answered, the device having capability to provide auditory sounds and the insertion of additional memory to increase the number of questions that can be used for any game being played with the device.

These and other objects of the present invention will become apparent upon a consideration of the drawings identified below together with a detailed description thereof.

DISCLOSURE OF THE INVENTION

In accordance with the present invention, there is provided an electronic game device useful for both education and fun. It includes a microprocessor having memory that stores codes for generating characters related to a topic, question and/or puzzle. Pluggable memory can be used to increase or replace the memory of the device. Selected of these characters are displayed to a user of the device to pose a question. The user, after providing an answer, can check that answer by calling for a display of the correct answer. Alternatively, the user can step to the next question. In the preferred embodiment there is a fixed timer that will automatically step to the next question if the user has not indicated such scroll. Furthermore, there is another timer that produces an unknown and random time duration to govern the length of a game. A user whose turn is occurring at this point becomes the loser. As such, the device becomes a challenge to both the very knowledgeable as well as to those who would otherwise have difficulty in winning. Such a device can be typically used with geographical topics, for example.

BRIEF DESCRIPTION OF THE DRAWINGS

FIG. 5 is a list of typical geographical questions and answers that can be used with the present invention.

BEST MODE FOR CARRYING OUT THE INVENTION

Figure 1:
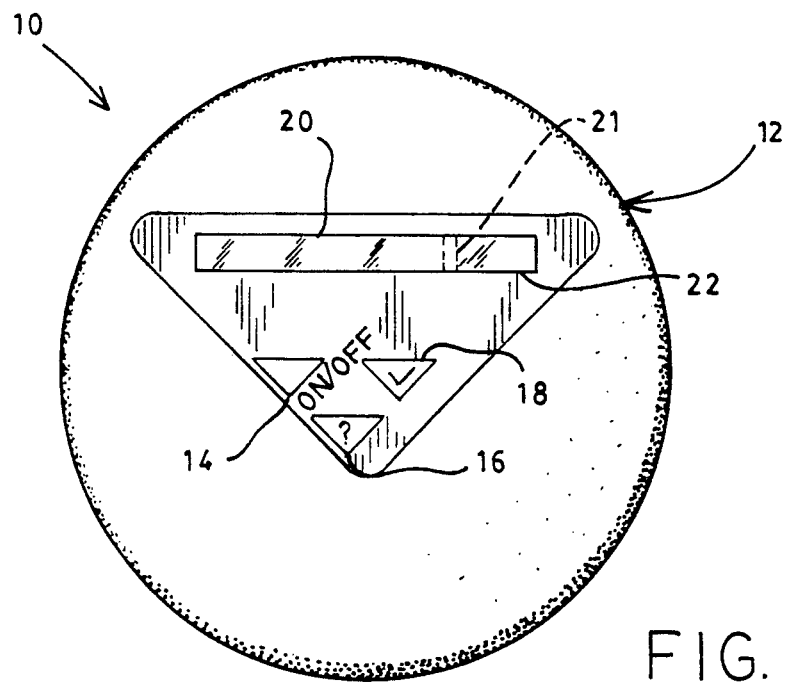
FIG. 1 is a planar view of one embodiment of a device embodying the present invention.

The present invention is depicted generally at 10 in FIG. 1 with the appearance being nearly identical to the device of the afore-cited patent of the assignee; namely, U. S. Pat. No. 4,959,017. Any features disclosed therein that are pertinent to the present invention are hereby incorporated herein by reference. This physical likeness is only due to a minimization of tooling changes. It will be recognized, however, that many other physical configurations for the present invention are possible. Mounted in the face of an enclosure 12 is a user input means in the form of a plurality of keys that can be operated by a user. One key 14 is an on-off switch to connect or disconnect circuits from a power source (not shown) in the form of batteries or power pack. A second key 16, marked as ?, scrolls through game choices or category choices or answer choices with consecutive key presses, or selects the next question in any category. The third key 18, marked as √, is typically used to accept a selected game or category to initiate a challenge and to call for a correct answer. Of course, other functions can be assigned to keys 16 and 18 if desired. Also in the face of the enclosure 12 is a display means 20 used to present a question or an answer to a user. Shown in phantom lines is a divider 21 that can be used to provide a second display means 22 that is used to present the answer or a portion of the answer to a question posed to a user.

Figure 2:
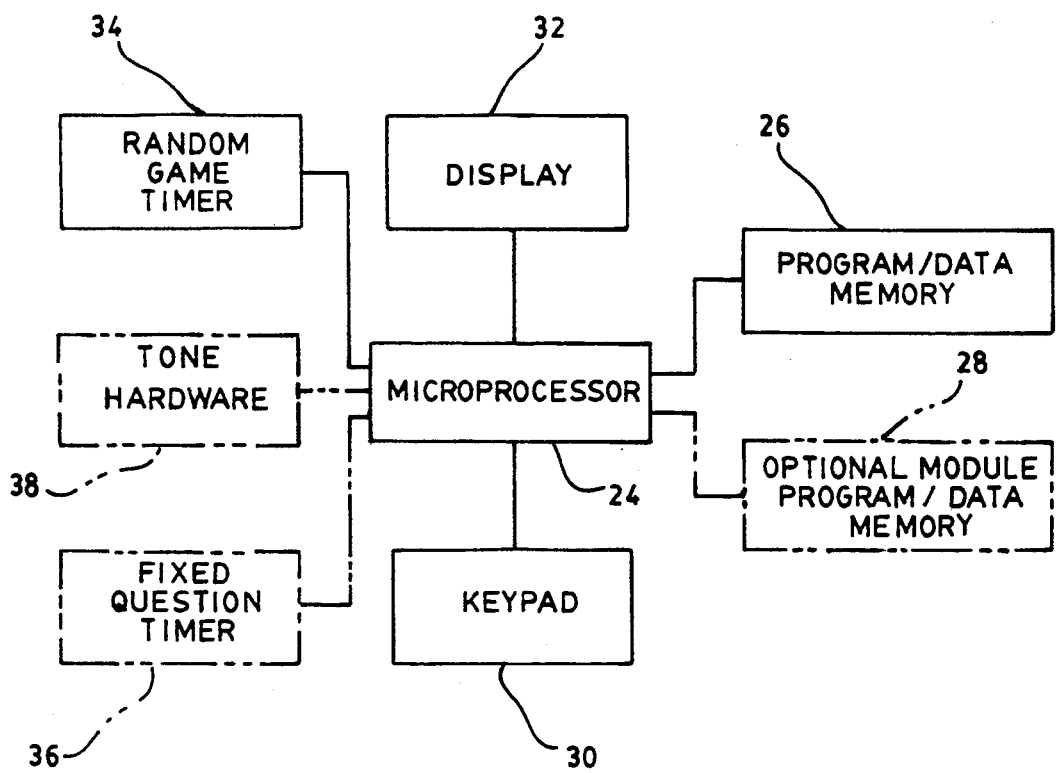
FIG. 2 is a block diagram of components of the present invention.

A block diagram of components for the device 10 is illustrated in FIG. 2. Indicated in solid lines are the components that are used in all embodiments of the invention, while those shown in phantom lines are components that will exist in a preferred embodiment. The overall operation of the present device is controlled by a microprocessor means 24 in combination with a program/data memory 26. The sequence of operation, the topic, the questions re the topic and the answers are maintained in this memory. If additional capacity is desired, an optional module of program/data memory is provided in the form of a pluggable unit 28. Input to the microprocessor by a user is accomplished by a keypad 30. This keypad is made up of the three keys 14, 16, 18 shown in FIG. 1. Questions, answers and other presentation to a user is accomplished by a display means 32 with the visual display being the elements designated 20 and 22 shown in FIG. 1.

Figure 6A:
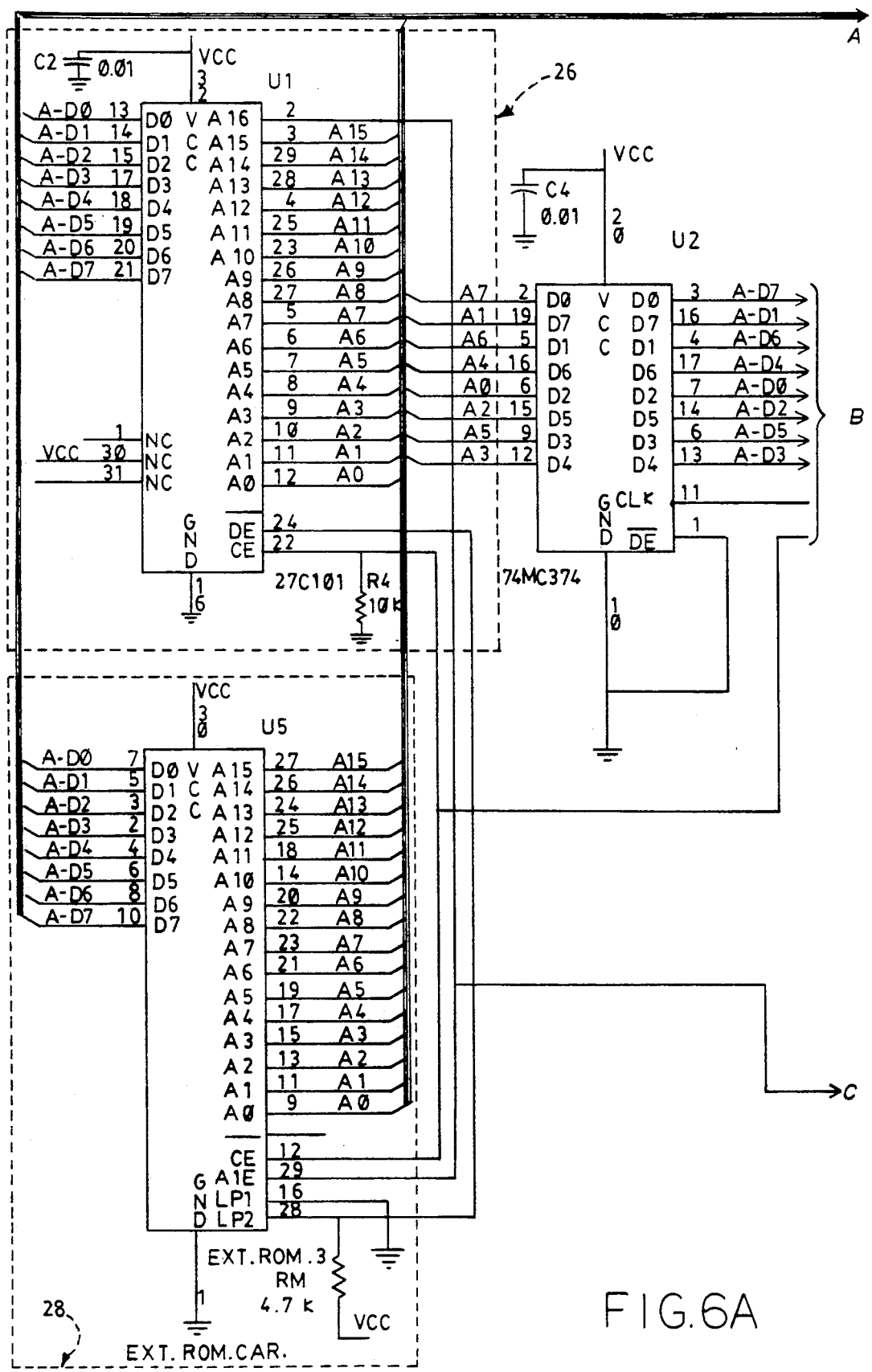
FIGS. 6A, 6B and 6C make up a schematic circuit diagram of the circuit components shown in FIG. 2.
Figure 6B:
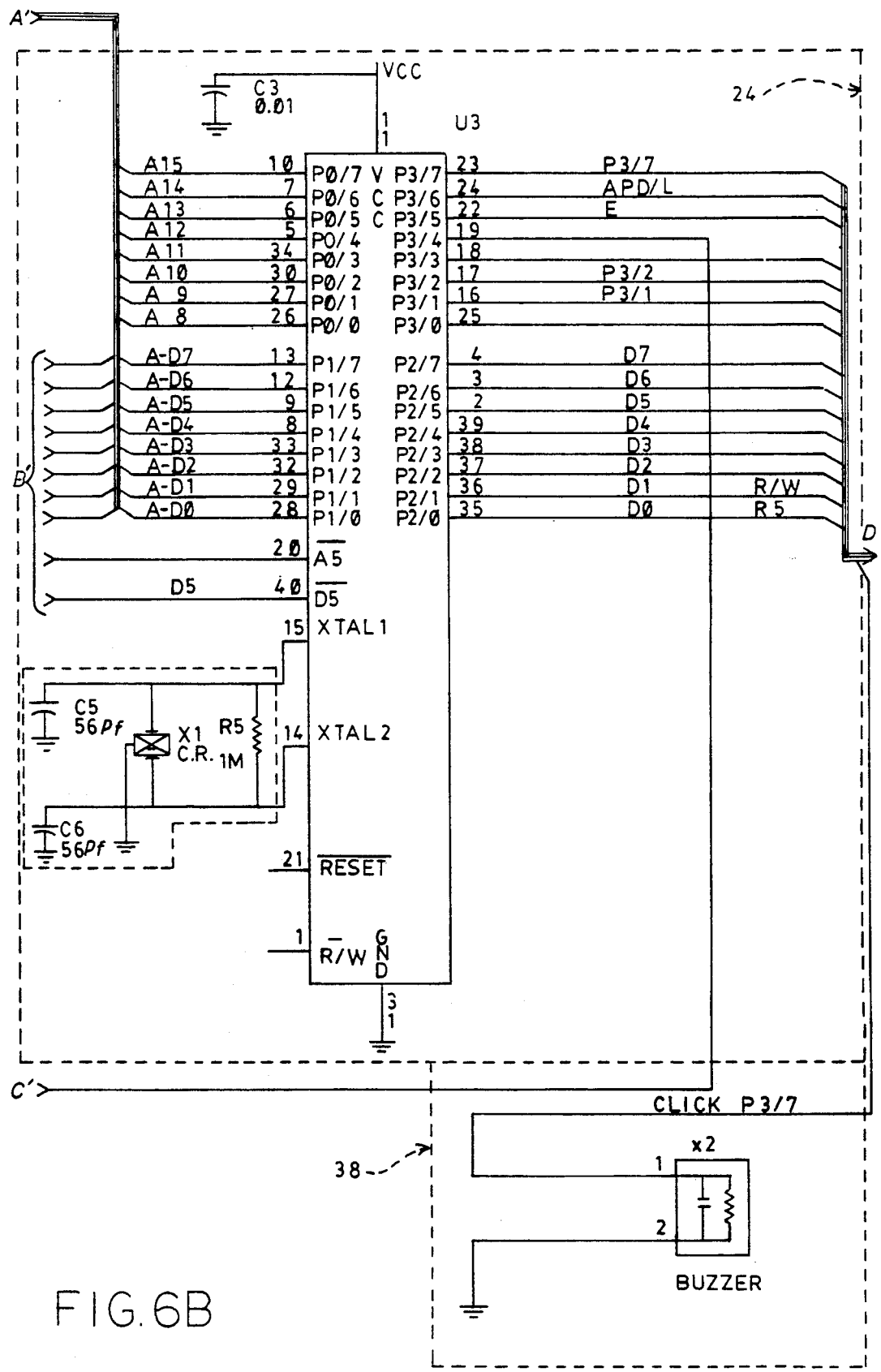
Figure 6C:
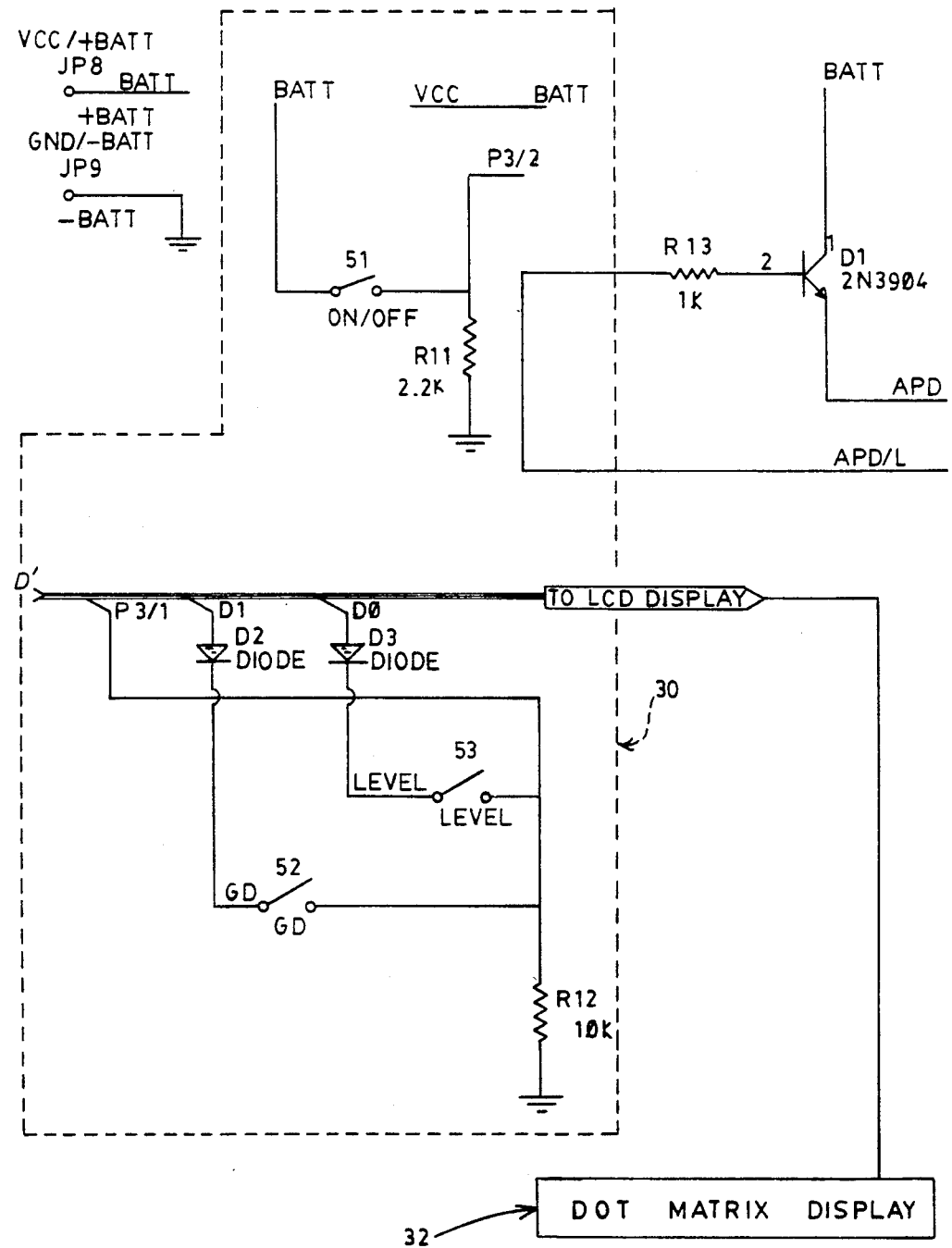

The components shown in block form in FIG. 2 are shown in a schematic circuit diagram of the present invention in FIGS. 6A, 6B and 6C. Individual of the subsections of components are conventional in nature are typical of those that will perform the functions, and will be fully understood by a person skilled in the art. Their collective action will be understood by the details of operation of the invention as set forth below.

An important feature of the present invention is the incorporation of a random "game over" timer 34. As will be discussed in greater detail in connection with a typical operation of the present device, this random timer will signal when the game is over without any prior warning. This adds the "chance" portion of the device. A second timer 36 is provided which is optional but would be present in a preferred embodiment of the invention. This timer, which is initiated when a question is posed, provides a set length of time for the answering of the question. At the end of the time interval, the answer is automatically displayed. However, if the question is answered and a user moves to another question, this timer 32 is reset.

Another optional portion of the present invention is tone hardware 38. This electronic component can be used to audibly announce the name of the game, signal when the game is over, or any other aspect of the play of the game.

Figure 3A:
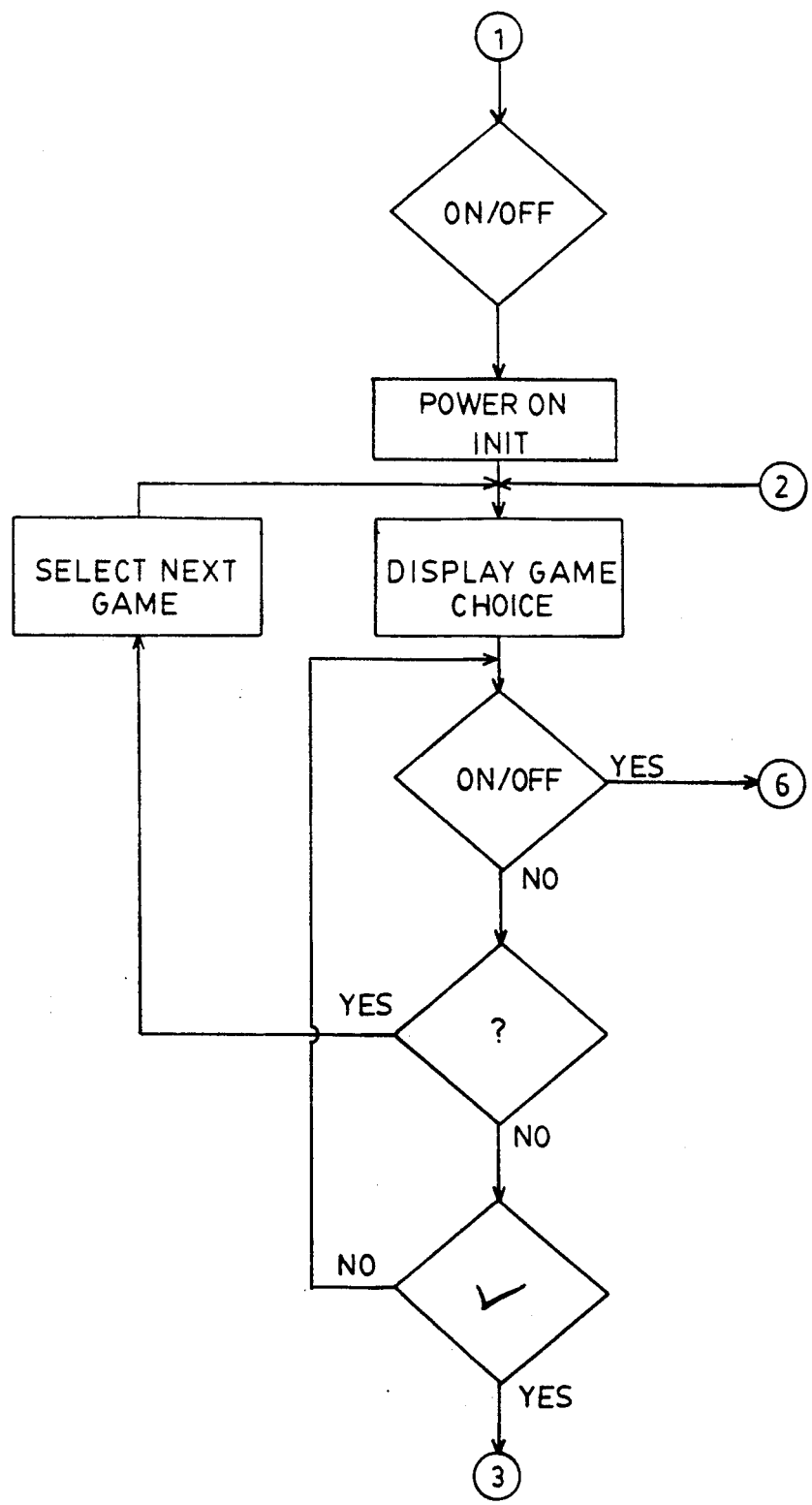
FIGS. 3A through 3F each illustrate a portion of a flow chart of operational steps of the device of the present invention.
Figure 3B:
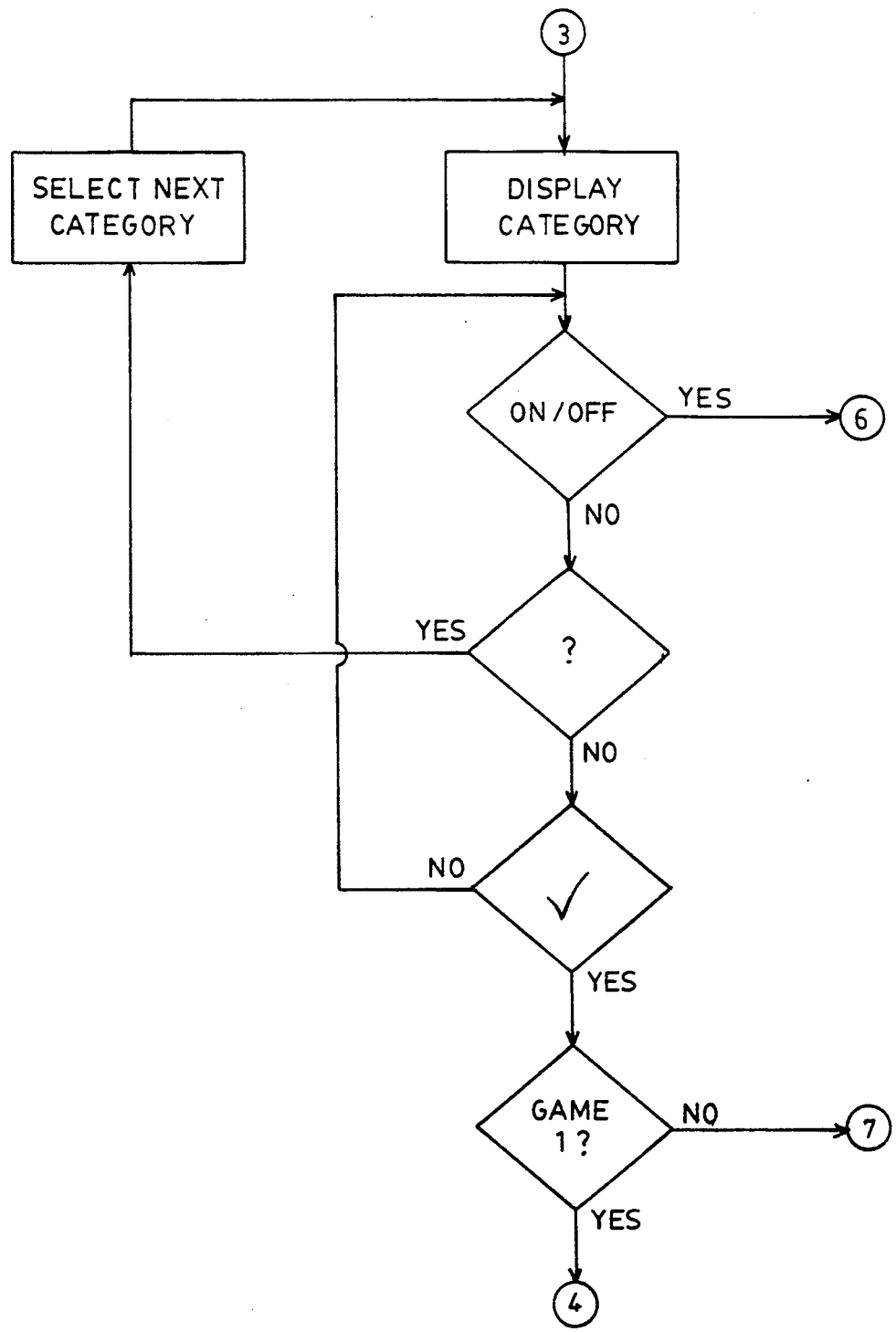
Figure 3C:
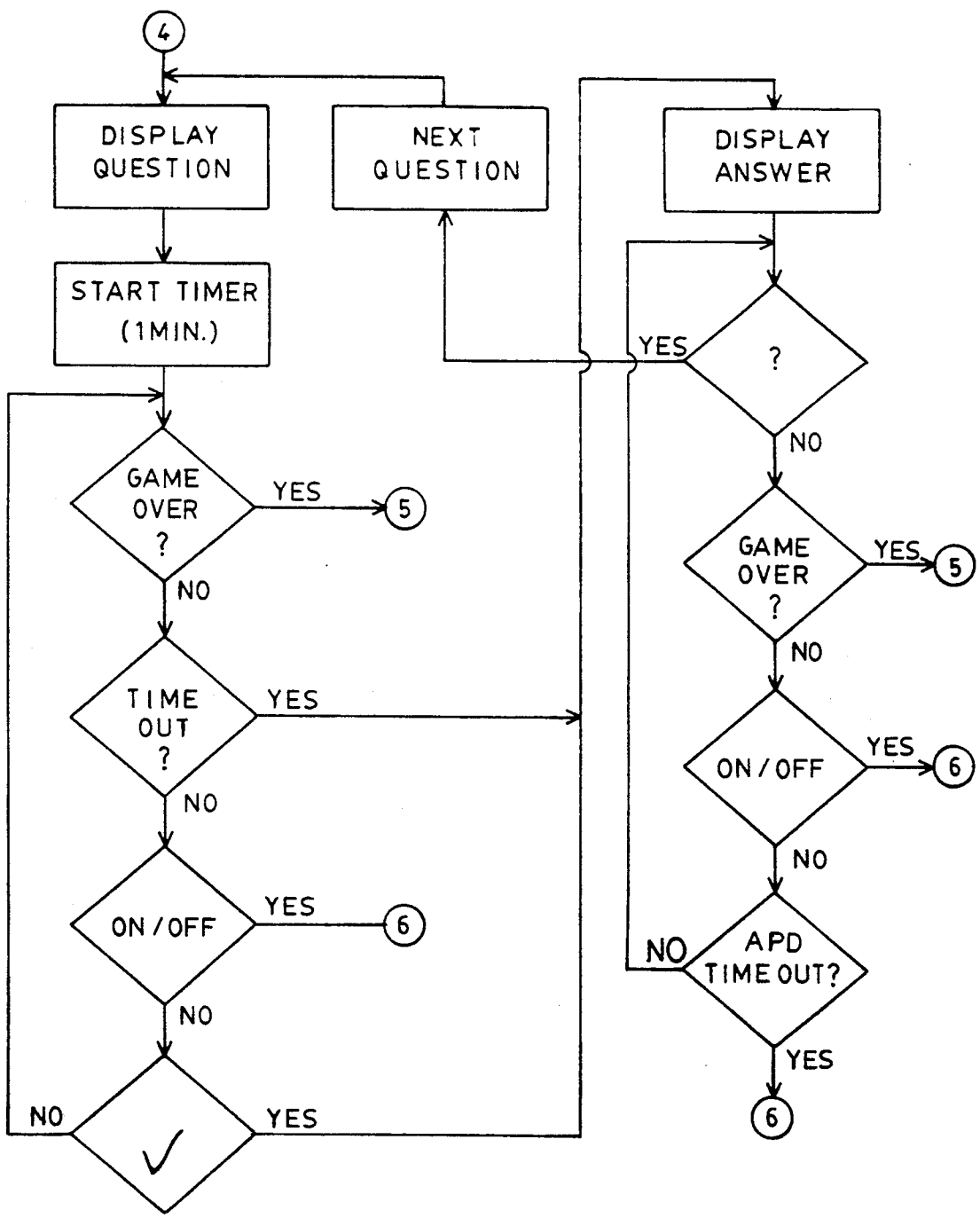
Figure 3D:
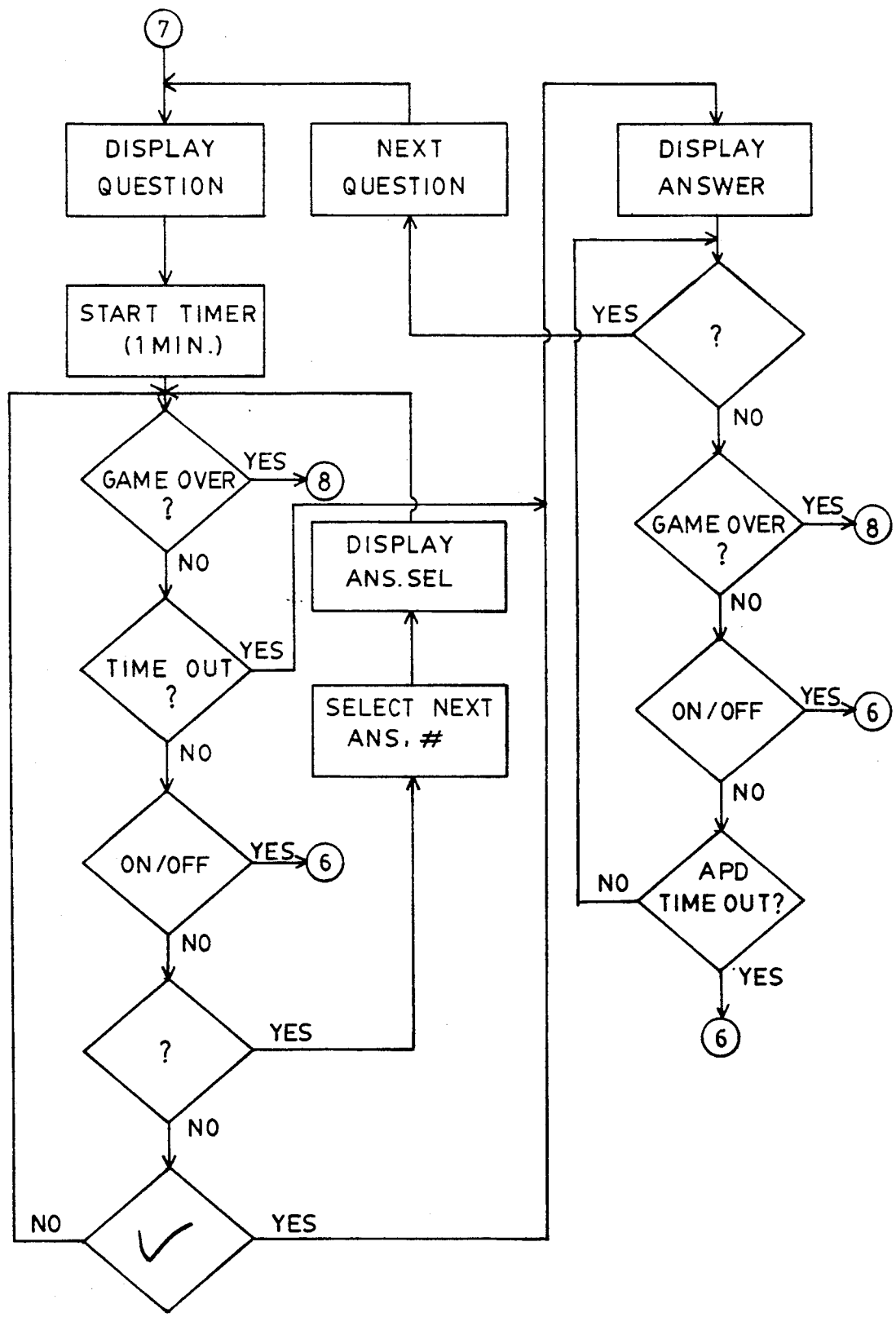
Figure 3E:
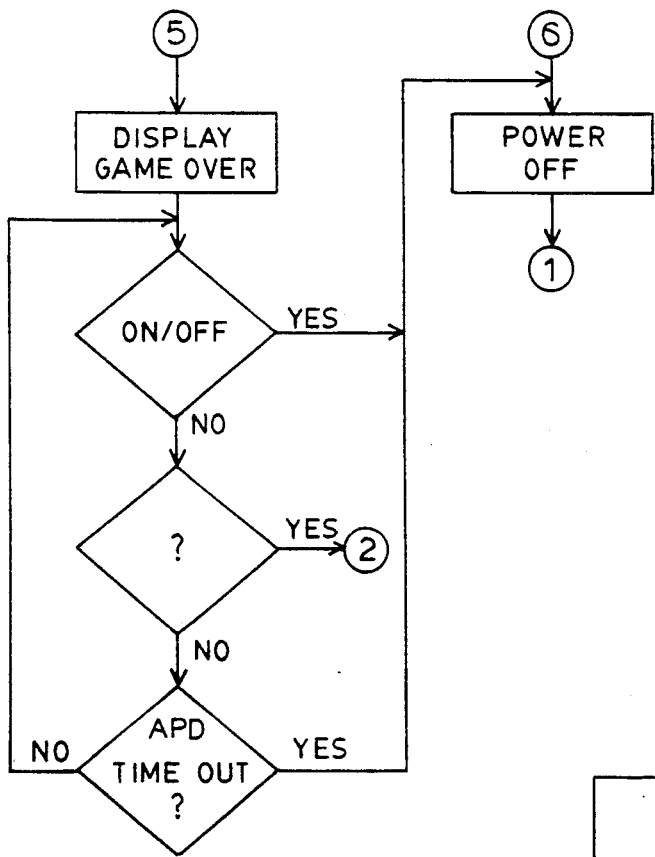
Figure 3F:
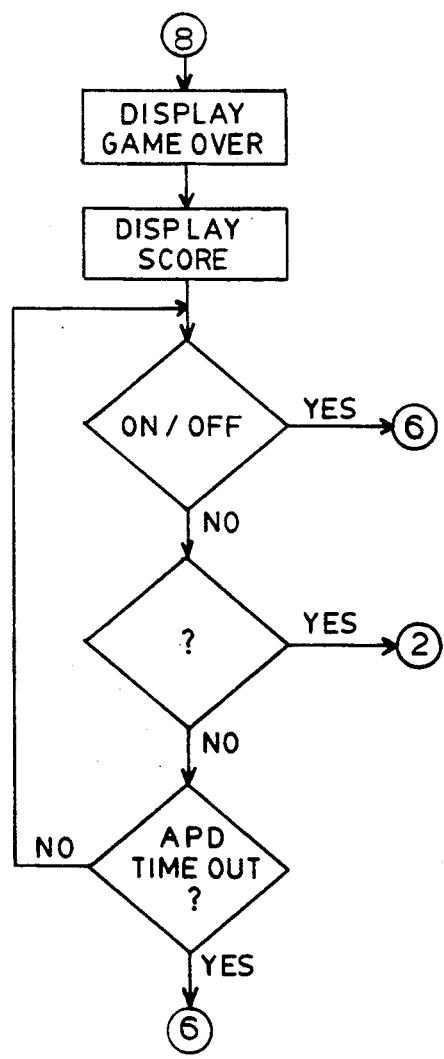

Portions of a functional flow chart for the present invention are shown in FIGS. 3A through 3F. In FIG. 3A, shown therein is that portion of the flow chart for turning on the device and selecting a particular game. FIG. 3B shows the manner of selecting a category. FIGS. 3C and 3D are the flow chart portions dealing with displaying questions and answers to Game No. 1 and Game No. 2, respectively, as described hereinafter. FIGS. 3E and 3F depict the portion of the flow charts for terminating a game, either Game No. 1 or Game No. 2, respectively. Persons skilled in the art will recognize that these portions of the flow chart are inter-related by the connections designated with numerical symbols 1 through 8.

Figure 4:
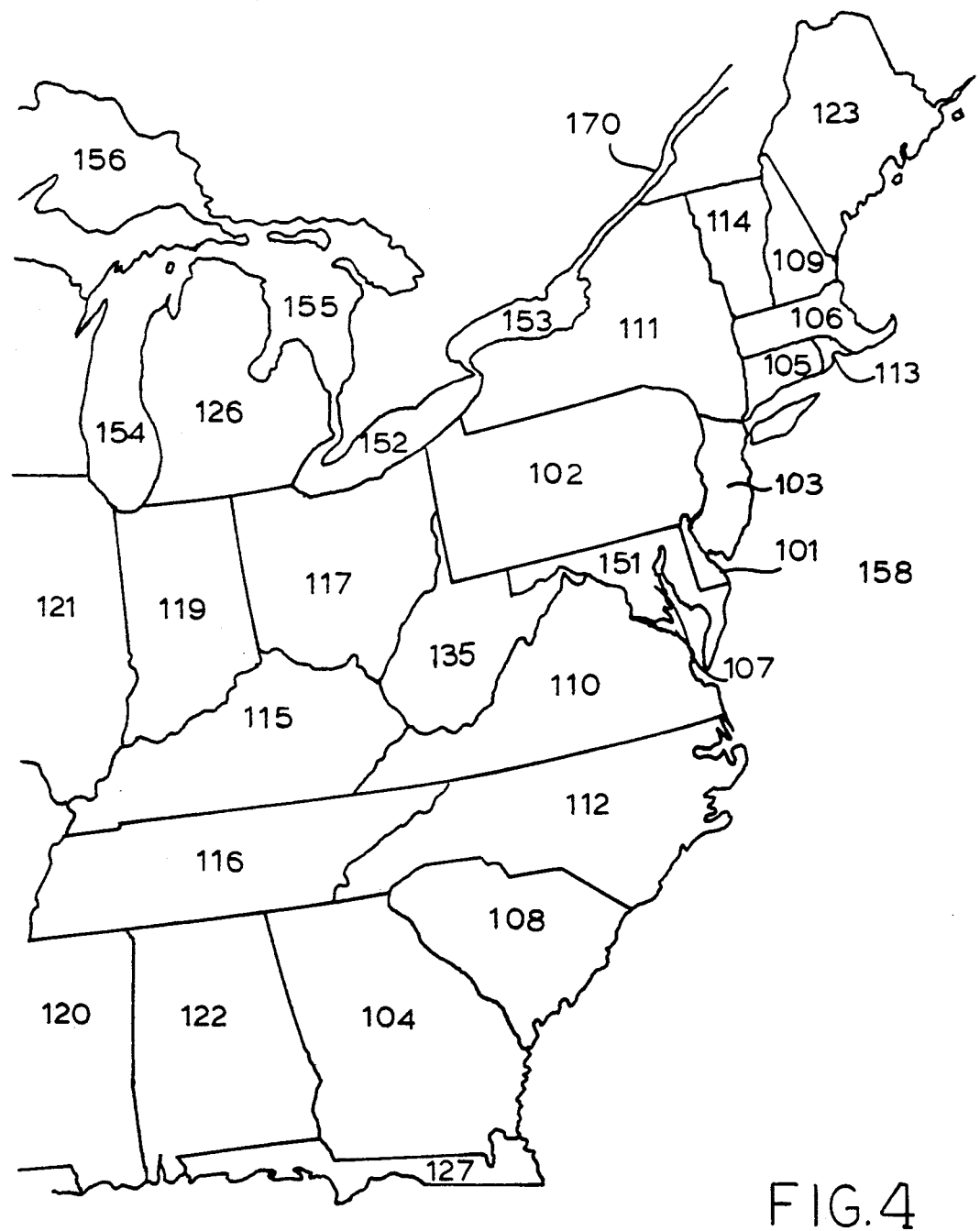
FIG. 4 is a depiction of a portion of a typical map that can be used in conjunction with the device of FIGS. 1 and 2 showing various geographical regions and features designated with numbers to facilitate answering questions posed with regard to geographical topics.

Although the memory unit 26 can be programmed for a large variety of games, the present invention will be described herein in connection with its use as a learning aid in the field of geography. Preferably the device is used in connection with a "map" such as illustrated in FIG. 4 wherein certain geographical regions or features are designated with a number for purposes better understood from a typical "play" of the device. Throughout this discussion, it should be remembered that the key designated with the ? is used to scroll through game choices and category choices or answer choices by consecutive key presses, and is used to select the next question when the category has been chosen. The key designated with the √ is used to accept a particular game or category, and to initiate a challenge to an answer by displaying the correct answer. In this field of geography the device can be programmed further to provide more than one type of game. The following describes two such games.

In order to initiate play, once a first player is selected (if there are more than one), the on/off key 14 is depressed. When tone hardware is present in the device, the players will be "welcomed" to use of the device. Either Game 1 or Game 2 is selected by use of the ? key 16. Generally Game 1 is for multiple players and Game 2 for solitaire play.

Assuming Game 1 is to be chosen, when this is depicted on the display 20, the player depresses the √ key to accept the game. The next choice is a category within the geography topic. Again the ? scroll key is used to review the various categories, such as U.S. geography topics or world topics. If the map of FIG. 4 is used in conjunction with the device, one side thereof would have imprinted thereon the United States, with the world imprinted on the reverse, for example. Selected regions on these maps are typically given a numerical designation. Typical U.S. geography categories are states/capitols, history, landmarks, etc. Similar categories within the world choices are available. When the desired category is seen on the display 20, the √ key is depressed to select that category. At this time a particular question directed to the category is displayed. Also, at the same time, the random-timer "game over" timer is started as is the fixed-time question timer. A typical challenge appearing in the display 20 is "Find Florida, its capitol is Tallahassee".

The player then points to the area on the map that corresponds with the answer to the posed question or calls out the number designated for that area. When a challenge is made by another player, the √ key is depressed to have the correct answer displayed (for example, the number assigned to the area of the correct answer). When the player has a correct answer, play passes to another player who again presses the ? key to obtain a new question. If the player has an incorrect answer or cannot answer, the same player must continue his/her turn by choosing another question. However, if at any time the "game over" timer times out (the tone hardware can produce an audible indication), the player currently using the device loses (or is eliminated if more than two persons are playing. Obviously, it is of value to quickly and correctly answer a question and pass the device to the next person before this game-over situation occurs. Whenever play is ceased, the on/off key is again pressed to turn off the power.

Of course, other playing rules can be adopted. For example, since a user's score is (or can be) displayed when the "game over" timer times out, the user with the highest score can be proclaimed the winner.

In Game 2, designed primarily for solitaire play, a similar challenge question is posed. The player then scrolls through the various numbers that appear on the display 20 (or 22) until what is believed to be the correct number appears. This number is "selected" by use of the √ key. As before, if the question timer times out, the answer is automatically displayed. The unit can keep score. This will be displayed when the game-over timer has timed out.

Listed in FIG. 5 are some typical categories that can be posed to users of the present device. The extreme left-hand column shows the code number given to the area on the accompanying map, the next column has the question (category) number, the next is the specific geography question/category, and the last column is the state. Obviously, these are typical for U.S. geography categories. It will be recognized that other types of questions can be prepared for world topics, or for any other overall topic that is desired. Internal permanent memory 26 in the device can be used to hold over 3000 questions. When additional question capability or replacement/new capability is desired, the auxiliary memory 28 can be inserted.

From the foregoing detailed description, it will be recognized by those skilled in that art that an electronic game has been provided that combines knowledge with chance: knowledge through promptly answering questions posed by the game, and chance through the random "game-over" timer where even if a player has correctly answered a large number of questions can be a loser. The questions are held in memory within a microprocessor, and a keyboard permits a user to select a given game from among several games, a given category from among several categories, and then select a particular question or challenge from among many. At any time an answer can be challenged with gives rise to a display of the correct answer. In a preferred embodiment there is a second timer, of fixed time duration, for governing the time available for the answering of a question. Also, there tone hardware to provide audible communication to the user of the device.

While a preferred embodiment has been shown and described, as well as a typical game (geography), it will be understood that there is no intent to limit the invention to such disclosure. Rather, the invention is to be limited only by the appended claims or their equivalents.

I claim:

1. A portable electronic puzzle device for increasing a user's knowledge of geography by causing said user to develop responses to questions about a geography topic, said device comprising:

an enclosure means, said enclosure means having a face for viewing by said user;

microprocessor means, including memory means, within said enclosure means for storing codes corresponding to a plurality of random sets of alphanumeric characters, each set being a geography topic together with a random cue to provide a question to said user relative to said geography topic and an answer to each said question;

user input means connected with said microprocessor means, said user input means being a keypad mounted in said face of said enclosure means including an on/off switch key for energizing and de-energizing said device, a topic/cue switch key for scrolling through game, category, and answer choices of said geography topic and for selection of said question, and an answer display switch key;

timing means within said enclosure means connected to said user input means and said microprocessor for generating an unknown random time duration and for generating a signal at a conclusion of each said random time duration to indicate completion of a game to a user; and display means in said face of said enclosure means connected to said microprocessor means, said display means having a first portion and a second portion, said first portion for displaying said question upon operation of said topic/cue switch key by a user, and said first and second portions for displaying said answer to said displayed question upon operation of said answer display switch key and upon completion of a game at a conclusion of said time duration.

2. The device of claim 1 wherein said memory means includes pluggably interchangeable external memory modules, each said external expansion memory modules containing selected individual and sets of alphanumeric characters for use in said display means.

3. The device of claim 1 further comprising a further timing means, within said enclosure means said further timing means having a fixed timing duration for governing a time interval for said user to answer said question.

4. The device of claim 1 further comprising a geography map means for coordinating designated areas on said map means with said geography questions.

5. The device of claim 1 wherein said signal generated at a conclusion of each random time duration causes a user's score to be displayed in said display means.

* * * * *